United States Patent [19]

Palani

[11] Patent Number: 4,462,762
[45] Date of Patent: Jul. 31, 1984

[54] WAVE ACTION MACHINE

[76] Inventor: Narayanaswami Palani, Whitefield, Bangalore, India, 560066

[21] Appl. No.: 375,788

[22] Filed: May 6, 1982

Related U.S. Application Data

[63] Continuation of Ser. No. 123,252, Mar. 7, 1980, abandoned.

[51] Int. Cl.³ .............................................. F04B 17/00
[52] U.S. Cl. ...................................... 417/332; 60/506
[58] Field of Search ...................... 417/332, 330, 331; 60/500, 497, 506

[56] References Cited

U.S. PATENT DOCUMENTS

| | | | |
|---|---|---|---|
| 594,078 | 11/1897 | Haag et al. | 417/332 |
| 635,390 | 10/1899 | Rehart | 417/332 |
| 681,913 | 9/1901 | Gillespie | 417/332 |
| 970,048 | 9/1910 | Harmon | 417/332 X |
| 1,003,930 | 9/1911 | Martell | 60/506 |
| 1,754,025 | 4/1930 | Lawrence | 417/332 |
| 4,111,610 | 9/1978 | Brown | 417/332 |

Primary Examiner—Richard E. Gluck
Attorney, Agent, or Firm—Williamson, Bains, Moore & Hansen

[57] ABSTRACT

A wave powered machine comprising a plurality of cylindrical floats connected to triangular arms. A pump is connected to each arm so to be actuated by rocking motion of each arm when each float rises and falls due to wave action.

1 Claim, 5 Drawing Figures

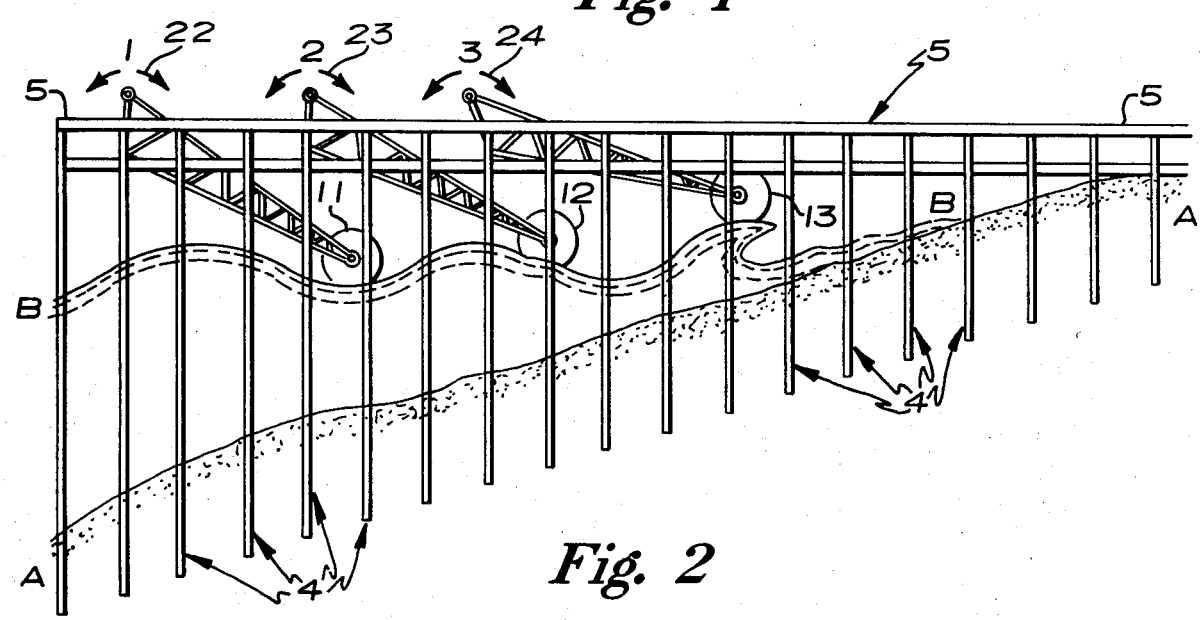
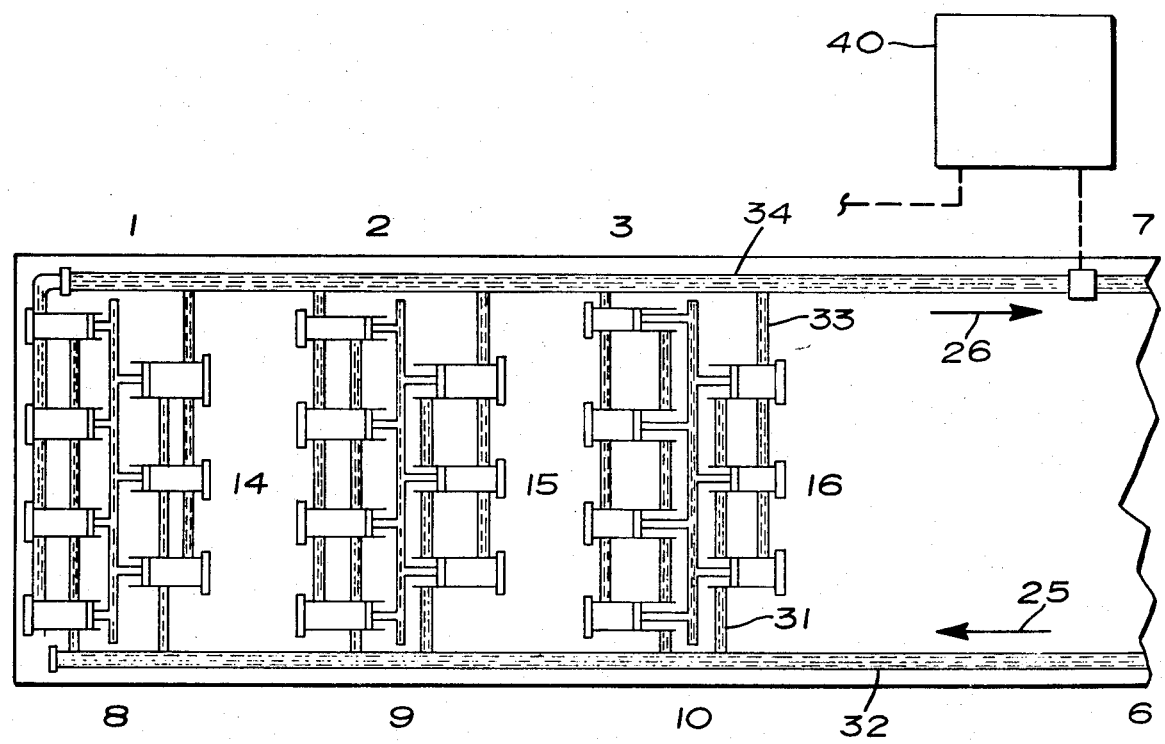

WAVE ACTION MACHINE

This is a continuation, of application Ser. No. 123,252, filed Mar. 7, 1980, now abandoned.

BACKGROUND OF THE INVENTION

This invention relates to a wave action machine comprising of a leak proof sheet metal cylindrical float resting on its circular side in the region of the surfs of deep water oceans or seas. The float is provided with an axle having end portions protruding from the circular sides of the said cylindrical float. The ends of the axles are secured to a pair of scalene triangular angle iron arms which in turn are hinged horizontally to a pair of erectiles or posts of a pier jutting out into the sea, at a position just below its deck and at the junction of the obtuse angle of the said triangular angle iron arm to thereby form its fulcrum whereby the float is suspended between the erectiles of the said pier end facing towards the shore. A shaft running parallel to the axle of the cylinder is fixed to the extreme ends of the arms, and this shaft forms the power arm, while the cylinder float forms the work arm when the surfs of the seas move the floating cylinder up and down by the thrust of their energy in rhythmic sequences. Movement of the float moves the shaft backward and forward in an articulated motion. The shaft is connected to the connecting rods of a set of piston and cylinder type reciprocating pumps that are employed to pump air or water to be stored up in pressure vessels such as high level reservoirs, when water is stored under pressure. The storage of compressed air or water pressure is utilized to energize prime movers at all times, without interruption.

This invention relates to a device that could extract a natural source of ever available energy from deep sea waves and for the storage of energy thus extracted to be employed for manifold applications. Since this source of natural deep sea wave energy is ever available in abundance, its potentiality is unlimited, provided however the wave characteristic is comprehensively mastered and utilized.

Day after day of windless spells when the air is motionless and even during the day when breezes blow towards the sea, the formation of humps of water rising from the calm sea that roll towards the shore in rhythmic sequences can be noticed. The region beyond the place where the first hump or swell is noticed is termed the fetch. A trough is formed in the same region as the swell moves toward the shore. When the trough moves beyond the swell towards the shore another hump of water is formed in the very same region where the first swell was noticed. So a train of crests of waves and troughs propagate towards the shore at constant periods. The water mass does not move but only the energy transports itself through the liquid medium. These energy pulses that from the wave trains wash on the shores and waste out their energy thrust.

Explorers of the ocean bottom have noticed the energy rush by as it sways the sea weeds back and forth in rhythm at all times. These deep water waves are clearly distinct from surface waves that are caused by the winds. The kinetic energy transferred to a water surface by a current of air is the causative factor for surface waves which could also be formed in vast expanses of water such as lakes and reservoirs, and these surface waves also transport pulses of energy long distances. The surface waves created by wind currents also merge with the natural deep water waves of the sea and waste their energies by lashing on the beaches.

The energy pulses transport themselves from the depths of the seas towards the shore and as these pulses strike the sea bottom, at a distance from the water's edge, the pulses tangentially move upwards and form the swell. As the said energy pulses strike the sea bottom near shore, each pulse rolls up the sands forming a clear arc of sand mixed with the brine and then mounds up to form the swell.

From the fetch of the sea commence the swell, the surf, the wave, the breakers and then the wasters that strike the beach and waste their energy. This train of crests and troughs of the waves propogate towards the shore in sharply well defined time intervals, termed as the wave period. The perpendicular distance from the trough to the crest of a wave is the wave height. The time required for one wave crest to move shoreward to the position of the next adjacent wave crest is the wave period and the distance between the crests is the wave length and half this distance of the perpendicular depth from crest downwards is the region of the thrust of energy of the wave. The total energy of the wave system is the sum of its kinetic energy and its potential energy. The kinetic energy is that part of the total energy due to water particle velocities associated with wave motion. Potential energy is that part of the energy resulting from part of the fluid mass being above the trough—the wave crest.

An object of this wave action machine is for harnessing and extracting energy from the deep waves of the oceans and seas. The location of the wave action machine will be in the region of the surf but beyond the breakers and before the trough of the swell. Such placement of the wave action machine is facilitated by the construction of a pier jutting out into the sea at right angles to the shore line. The deck of the pier as constructed shall be at a height well above mean water line at high tide. Envisioning the times beyond a hundred years and with due circumspection the pier has to be located in a beach free from erosion or accretion. River mouths and the direction of the seasonal monsoon winds, the sandspits and the littoral drift along the coast line are the causative factors for sea erosion or accretion and must be avoided in selecting the location of the pier which supports the wave action machine. A steep foreshore with hard soil conditions is another prerequisite in the location of the pier which supports the wave action machine.

FIGURES OF THE DRAWING

FIG. 1 is a diagrammatic sectional view of a sea coast illustrating the contour of the sea coast bottom and contour of the waves;

FIG. 2 is a diagrammatic sectional view illustrating a plurality of wave action machines supported from a pier;

FIG. 3 is a top plan view of the pier shown in FIG. 2 and illustrating the arrangement of the pumps which are operated by the wave action machines;

DESCRIPTION OF THE PREFERRED EMBODIMENT

Figure 4:
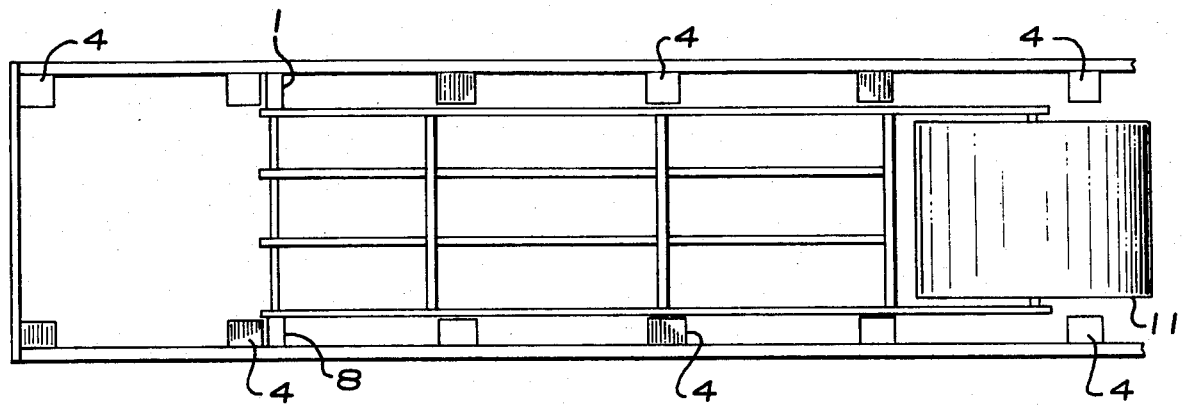
FIG. 4 is a diagrammatic plan view of a wave action machine illustrating the connection of the arms to the erectiles or posts of the pier.

The wave action apparatus will be more fully described with reference to the illustrations in the accompanying drawings wherein like numerals indicate the same embodiments in the figures.

Referring now to FIG. 1, the vertical section of a sea coast is shown and diagrammatically depicts the propagation of the wave contour B B is from right to left beginning in the region of the fetch and showing the mounding up of water to form the swell, a trough, the surf, the trough, the wave, the trough, the breaker, the trough and the wasters that lash on the shore respectively. A A shows the contour of the sea bottom, and the berm is illustrated at the extreme left.

Referring now to FIG. 2, the reference numeral 4 refers to the plurality of pile driven steel shafts that supports the deck 5 of the pier. A A is the contour of the sea bottom and B B indicates the wave propagation from left to right commencing from the region of the surf, the trough, the wave, the trough, the breaker, the trough and the wasters that end up at the beach. The reference numerals 11, 12 and 13 refer generally to the sheet metal cylindrical floats each of which is supported by a pair of the scalene triangular angle iron arms 20 which are hinged to a pair of the erectiles of the pier 5 by hinge pivots 21 at a position just below the reinforced concrete deck 5 of the pier. Reference numerals 1, 2, 3 refer to the shafts which are connected to the topmost ends of a triangular angle iron pair of arms. The directional arrows 22, 23 and 24 show the articulated motion as caused by the momentum of the cylindrical floats by the crest and trough of the waves as they propagate towards the shore.

In FIG. 3, reference numerals 14, 15 and 16 refer to the piston and cylinder reciprocating pumps and their connecting rods as hinged to the power shafts 1, 2 and 3 respectively of the three wave action machines, respectively. The directional arrow 25 indicates the direction of the flow of water in the penstock or pipes from which water is fed into the pumps and the directional arrow 26 indicates the direction of the flow of water as it is pumped to raise the water level to a high level reservoir. This pump arrangement is placed on the floor of the deck of the pier 5.

Referring now to FIG. 4, it will be seen that the plan of the erectiles or posts 4 of the pier and a wave action machine is thereshown. It will be seen that the arms 20 are hinged to a pair of erectiles 4 at a position just below the deck of the pier at the obtuse angle joint of the said scalene triangle angle iron arms supporting the sheet metal cylindrical float 11.

Figure 5:
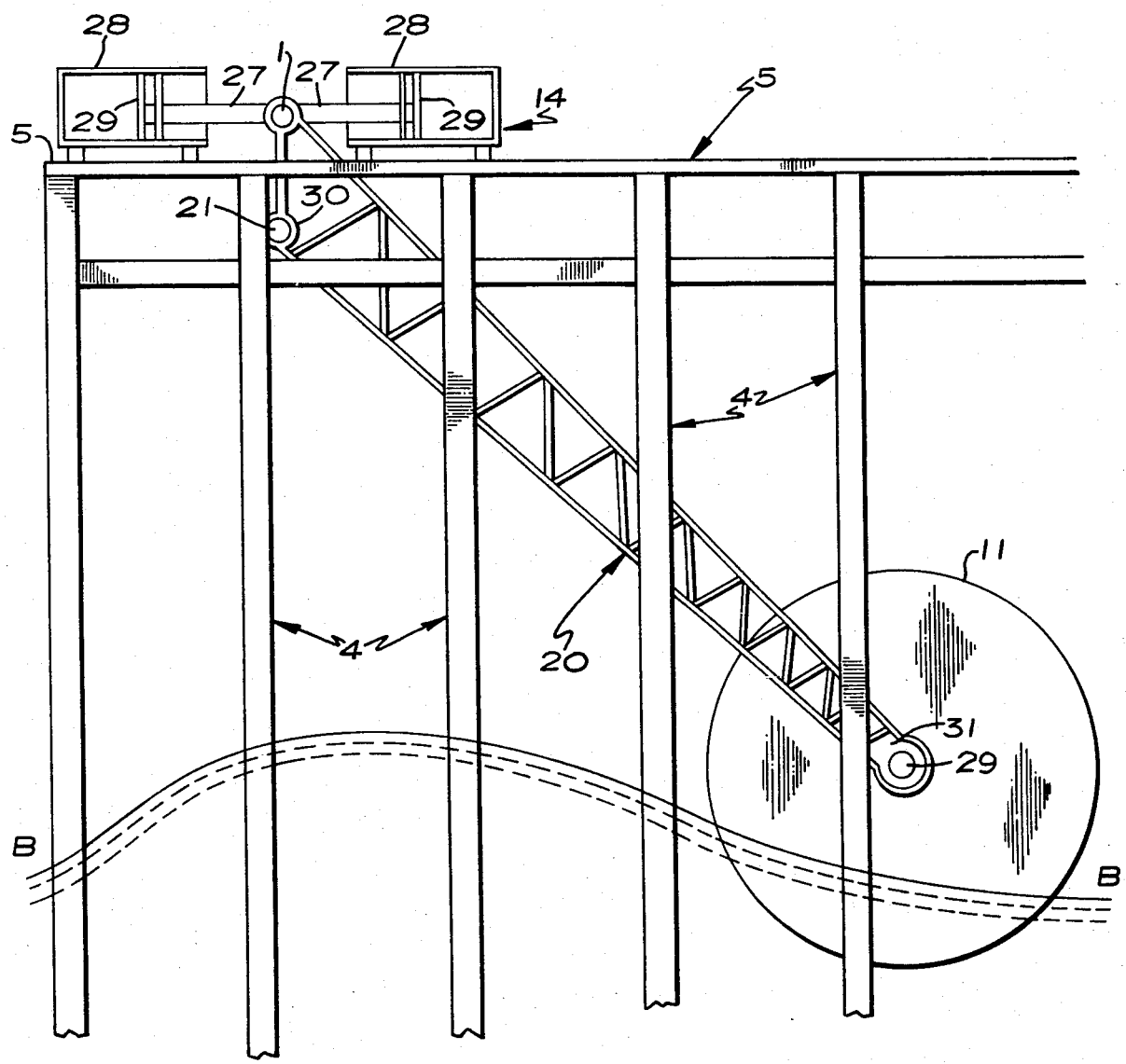
FIG. 5 is a side view of a wave machine partly in section and partly in elevation illustrating details of construction thereof.

In FIG. 5, the construction of a pair of piston and cylinder reciprocating pumps 14 and their associated connecting rods 27 is shown. The arm 20 is hinged to the power arm shaft of the wave action machine on the deck 5 of the pier. B B again indicates the propagation of the surf from the left to right. Each pump 14 includes a cylinder 28 in which is movable a piston 29. The piston 29 is connected to a connecting rod 27 which is connected to a shaft 1. Referring now to FIG. 3, it will be seen that each of the shafts 1, 2 or 3 have a plurality of pumps connected thereto. Since the pumps are arranged on opposite sides of the associated power arm shaft, one pump is being compressed while another pump is in an intake phase.

Disclosing the best method of manufacture and how the wave action machine performs, the water tight sheet metal cylindrical float and its supporting scalene triangular angle iron arms are fabricated in the workshop located adjacent the pier, the floor of its deck being on level with the floor of the workshop. The cylinder is tested so as to be free from leaks. The ends of axle 31a protrude from the centers of the circular ends of the float and are made of stainless steel. The scalene triangle angle iron arm assembly 20 is provided with a hinging mechanism 21 including beams 30. Each arm 20 is also provided with a hub 31 to house the end of the axle of a cylindrical float. The upper end of each arm 20 is connected to a power arm shaft.

The pier is constructed at a selected site having a steep incline commencing from the beach and extending into the sea at right angles to the shore line and into the region of the swell. The deck of the said pier extends up to the shore and is at a height well above the highest tide. The deck 5 of the pier will be an elevation to provide a space to permit the hoisting up of the wave action machine in an assembled condition well above the water level. In this position it would be convenient to fix the connecting rods of the pumps to the power shaft of the wave action machine.

To select the best location for the construction of the pier, the high tide level, the astronomical spring tide level, the high storm water level and the maximum height of waves during rough seas have to be taken into account in determining the height of the pier. A hill side slope promontory jutting out into the sea would be an ideal location since the shore line will be hard ground and a reservoir could be built on the hill at a high level for the storage of fresh water. The force created by the downward flow of the stored water can be used to drive turbines located at the foot of the hill just above the level of the deck of the pier, near the shore, so that the water could be fed back to the pumps located on the pier to permit pumping of this water back to a high level reservoir built on the hill.

After the pier has been constructed conforming to the aforesaid requirements the wave action machine is fabricated in the workshop, is moved into position with the help of trolleys and is mounted onto the hinge supports of the erectiles, as illustrated in the drawings. While doing so, the cylindrical float of the wave action machine is held well above the waters to facilitate the fixing of the connecting rods of the pumps to the power shaft to the wave action machine. Then the float of the wave action machine is lowered down to float on the sea to extract the energy transmitted by the waves. As many of the wave action machines as are required to store energy of the required quantum could be employed by widening the pier laterally.

The energy acquired by the power shaft of the wave action machine may also be employed to operate air pumps to store compressed air for operating air turbines for the generation of electrical energy.

Each pump cylinder 28 is provided with an inlet and an outlet. Each inlet is connected by a short conduit 31 to an elongate supply conduit 32. Each outlet is connected by a short conduit 33 to an elongate conduit 34 through which pressurized fluid flows into a storage structure 40. it will be seen that during the compression stroke, fluid under pressure will be directed through the conduit 32 into a suitable storage structure. Since the pumps 14 are arranged in opposed groups along each shaft 1 (2 or 3) then when one group of pumps is undergoing a compression stroke, the other group will be undergoing an intake stroke.

I claim:

1. A wave action machine connected to a pier which projects into water and being operable for harnessing and storing energy produced by the action of waves, comprising:

a bouyant cylindrical float positioned in the water and adapted to float therein, a pair of elongate spaced-apart substantially similar parallel arms, each arm being of triangular configuration having one short side and two long sides, means pivotally connecting one end of each triangular arm at approximately the apex of the longer sides thereof to said float, means pivotally connecting each triangular arm at approximately the apex of the short side and one long side thereof to the pier to permit pivoting of the arm about a horizontal axis, said short side of each triangular arm extending between the pivotal connection of the arm with the pier and a pivotal connection of the arm with a horizontal shaft, a plurality of pumps on said pier and each including a horizontal cylinder, a piston movable in the cylinder, a horizontal piston rod secured to the piston for movement therewith, each cylinder having an inlet and an outlet, means connecting the inlet of each pump to an elongate supply conduit for supplying of fluid to the cylinders, means connecting the outlet of each pump to an outlet conduit, the latter being adapted to be connected to a storage structure whereby fluid compressed by the pumps will be directed to and stored in a storage structure, certain of said pumps being arranged in opposed relation with respect to each other, a horizontal shaft pivotally connected with the piston rods of said pumps, means pivotally connecting the shaft with the other end of each of said arms at approximately the apex of the short side and the other long side thereof whereby said upward and downward movement of the float in response to wave action alternately produces compression and intake strokes of the pistons of said pumps, and when the piston of one pump is moving in a compression direction, the piston of another pump is moving in an intake direction.

* * * * *